United States Patent
Chen

(10) Patent No.: US 6,386,328 B1
(45) Date of Patent: May 14, 2002

(54) DISK BRAKE ASSEMBLY FOR BICYCLES

(76) Inventor: Tse-Min Chen, No. 14, Lane 69, Tian Jin Road Section 4, Pei Tun Dist., Taichung City (TW)

( * ) Notice: Subject to any disclaimer, the term of this patent is extended or adjusted under 35 U.S.C. 154(b) by 0 days.

(21) Appl. No.: 09/765,418

(22) Filed: Jan. 22, 2001

(51) Int. Cl.[7] .................................................. B62L 5/00

(52) U.S. Cl. ................................ 188/24.11; 188/24.12; 188/26; 188/205 R

(58) Field of Search ........................... 188/24.11, 24.22, 188/26, 344, 24.12, 24.13, 24.14, 20, 24.15, 24.16–24.21, 205 R, 71.1, 72.9, 18 A; 280/276

(56) References Cited

U.S. PATENT DOCUMENTS

| | | | | |
|---|---|---|---|---|
| 3,949,838 A | * | 4/1976 | Fuhrman | 188/26 |
| 3,989,124 A | * | 11/1976 | Fujii | 188/26 |
| 5,957,244 A | * | 9/1999 | Turner | 188/26 |

* cited by examiner

*Primary Examiner*—Douglas C. Butler

(57) ABSTRACT

A disk brake assembly includes a brake disk connected a wheel hub and a wheel shaft extends through a hole in the brake disk. A connection member is mounted to the wheel shaft and positions the brake disk is located between the connection member and the wheel hub. The connection member has two connection ports and a clamp device is connected to the two connection ports. A bicycle frame such as a front fork or a chain stay has a slot in which the wheel shaft is engaged. The connection member is securely positioned between the brake disk and the bicycle frame.

3 Claims, 6 Drawing Sheets

DISK BRAKE ASSEMBLY FOR BICYCLES

FIELD OF THE INVENTION

The present invention relates to a disk brake assembly which are mounted to a wheel shaft but the front fork or the chain stays so that the assembly always precisely connected with the wheel shaft.

BACKGROUND OF THE INVENTION

A conventional front wheel disk brake assembly 1 for bicycles is shown in FIG. 1 and generally includes a clamp device 11 having two connection ports 12 which are respectively connected to two lugs 14 extending from the front fork 13. A disk 15 is mounted to the front wheel shaft 16 and the end fork 17 of the front fork 13 is engaged with the shaft 16. The clamp device 11 of the rear wheel disk brake assembly 1' as shown in FIG. 2 has the same structure to be connected to the chain stay 130 by connecting the connection ports 12 to the lugs 14 extending from the chain stays 13. There is a hook 17' in the chain stay 130 to be connected with the rear wheel shaft 16 and the disk 15 is also mounted to the rear wheel shaft 16. Because the clamp device 11 has to be connected to the lugs 14 of the front fork 13 or the chain stay 130 so that the positions of the holes for the bolts extending through the connection ports 12 and the lugs 14 have to be precise or the connection will be not stable. When adjusting the wheel shaft 16 in the end fork 17 of the front fork 13 or the hook 17' in the chain stay 130, the relative positions between the clamp device 11 and the disk 15 changes which could affect the safety of operation. The front fork 13 and the chain stay 130 have to have the lugs 14 otherwise the disk brake assembly cannot be connected. For some bicycles such as BMX, the distance between the front wheel shaft and the rear wheel shaft is frequently adjusted so that until now, the BMX series do not equipped with disk brake assembly.

The present invention intends to provide a disk brake assembly which is directly connected to the wheel shaft so that the adjusting of the wheels will not affect the installation of the disk brake assembly.

SUMMARY OF THE INVENTION

In accordance with one aspect of the present invention, there is provided a disk brake assembly and includes a wheel hub with a shaft extending from two ends of the wheel hub. A brake disk is connected to the wheel hub and the shaft extends through a hole in the brake disk. A connection member has a connection hole for the shaft extending therethrough and the brake disk is located between the connection member and the wheel hub. The connection member has two connection ports and a clamp device is connected to the two connection ports. A bicycle frame has a slot in which the wheel shaft is engaged. The connection member is securely positioned between the brake disk and the bicycle frame.

The primary object of the present invention is to provide a disk brake assembly for bicycles wherein the clamp device of the brake assembly is not connected to the front fork or the chain stay so that the wheel can be adjusted relative to the front fork or the chain stay without affecting the disk brake assembly.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
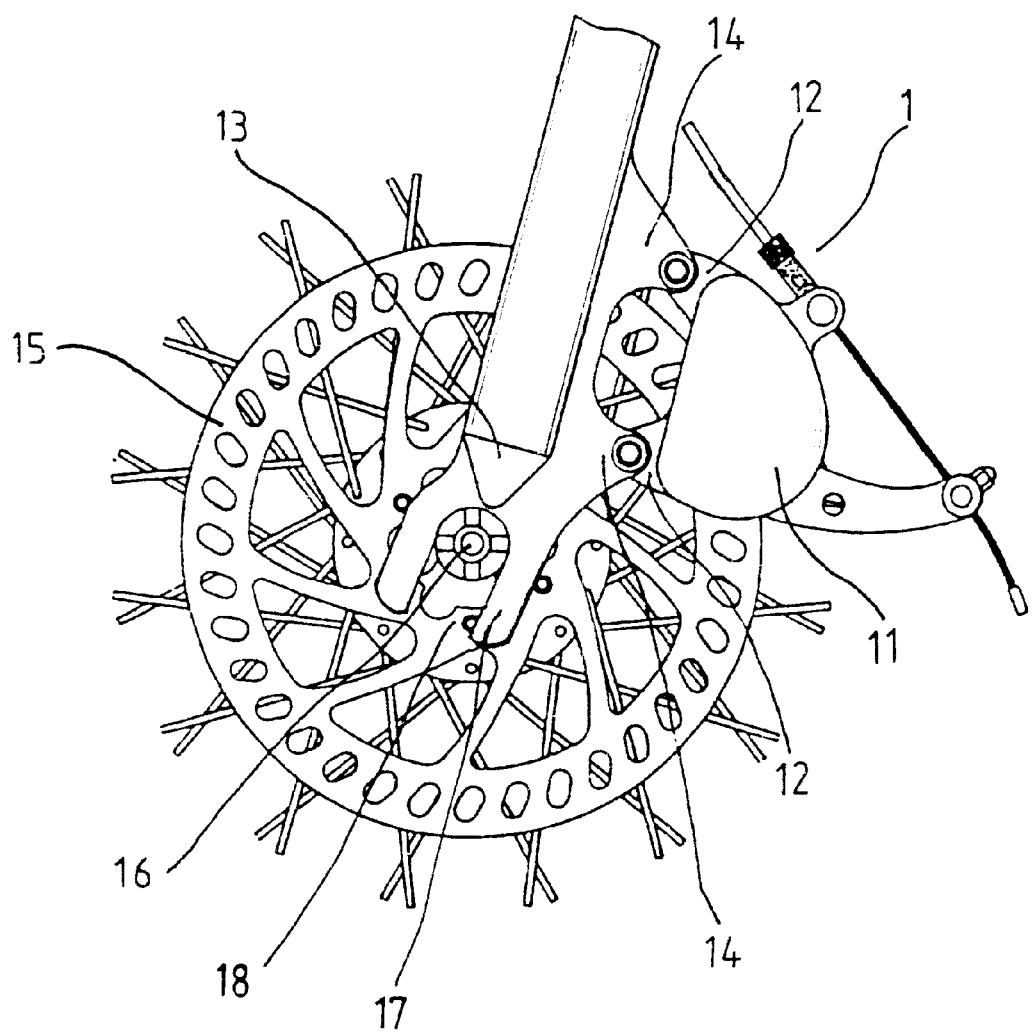
FIG. 1 is a side elevational view to show a conventional front wheel disk brake assembly.
Figure 2:
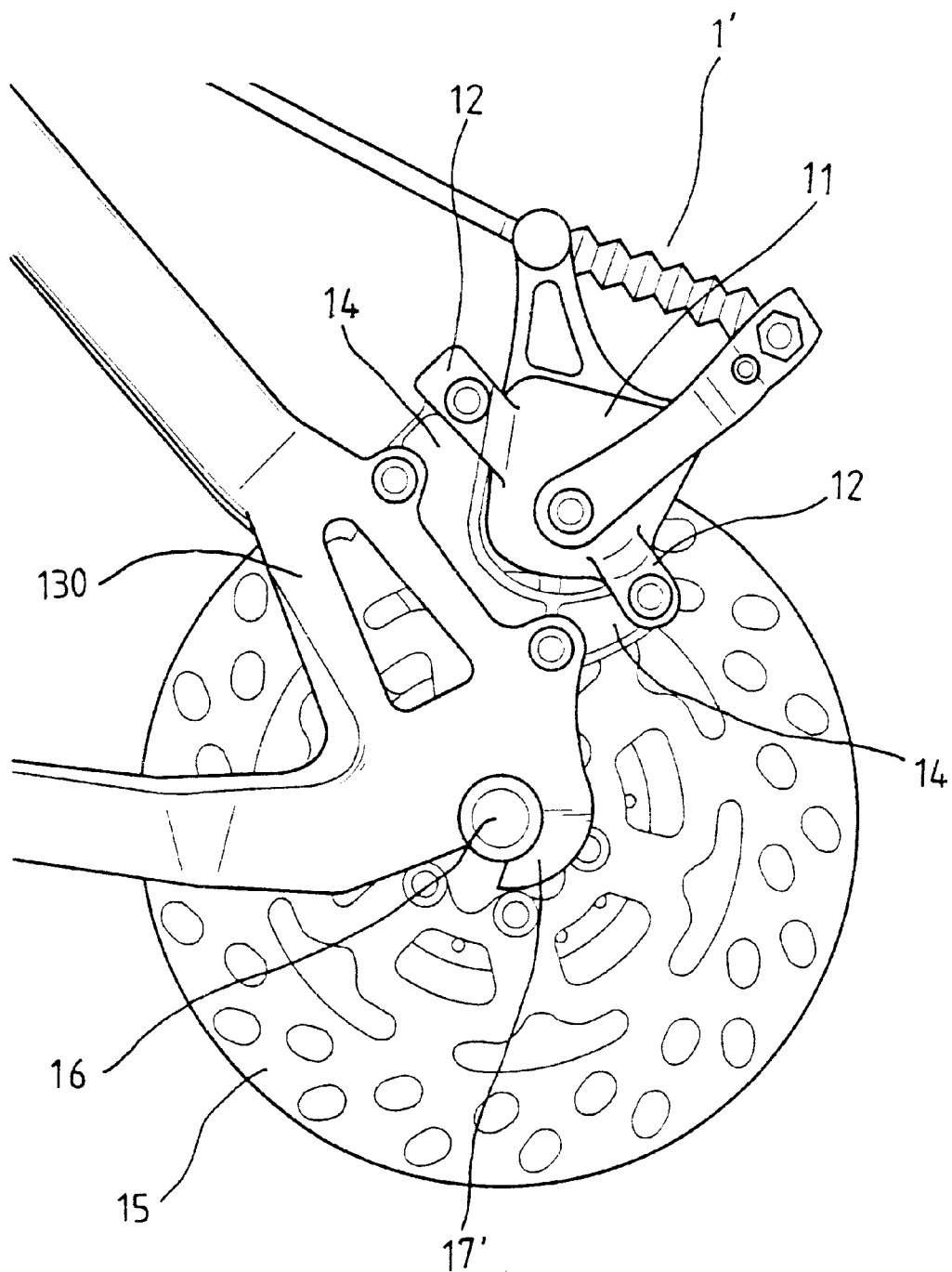
FIG. 2 is a side elevational view to show a conventional rear wheel disk brake assembly.
Figure 3:
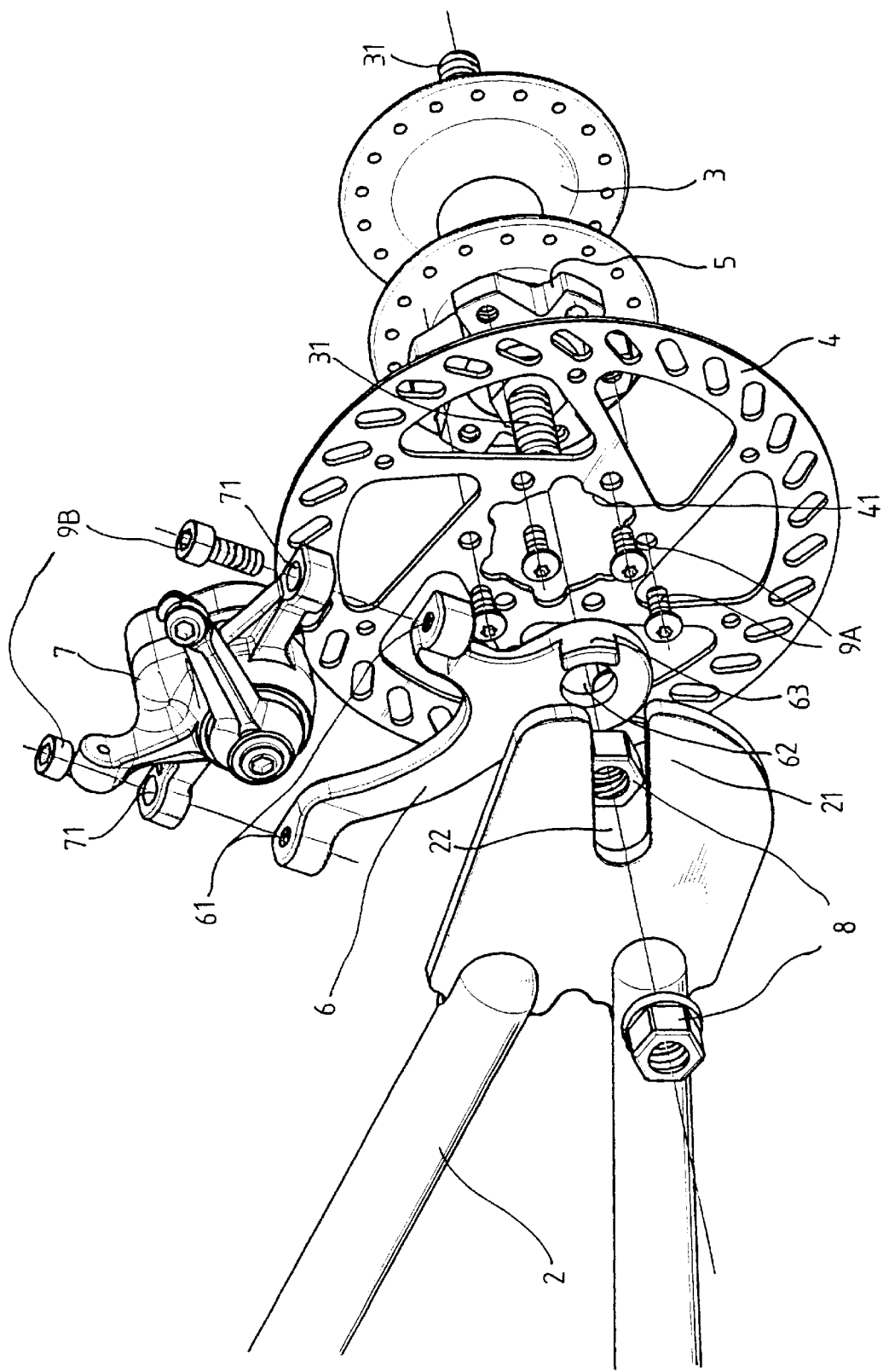
FIG. 3 is an exploded view to show a disk brake assembly of the present invention.
Figure 4:
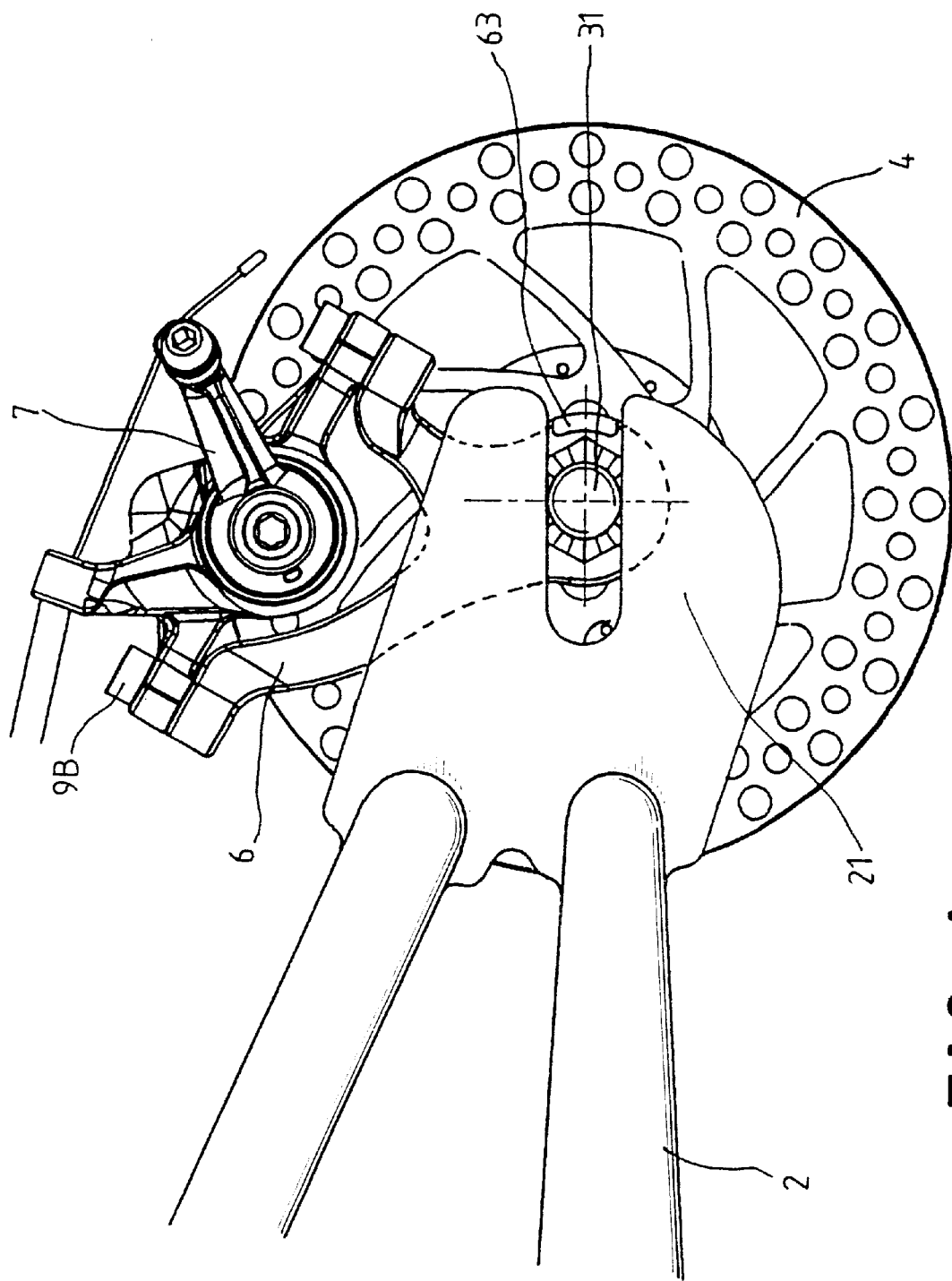
FIG. 4 is a side elevational view to show the disk brake assembly of the present invention connected to the rear wheel.
Figure 5:
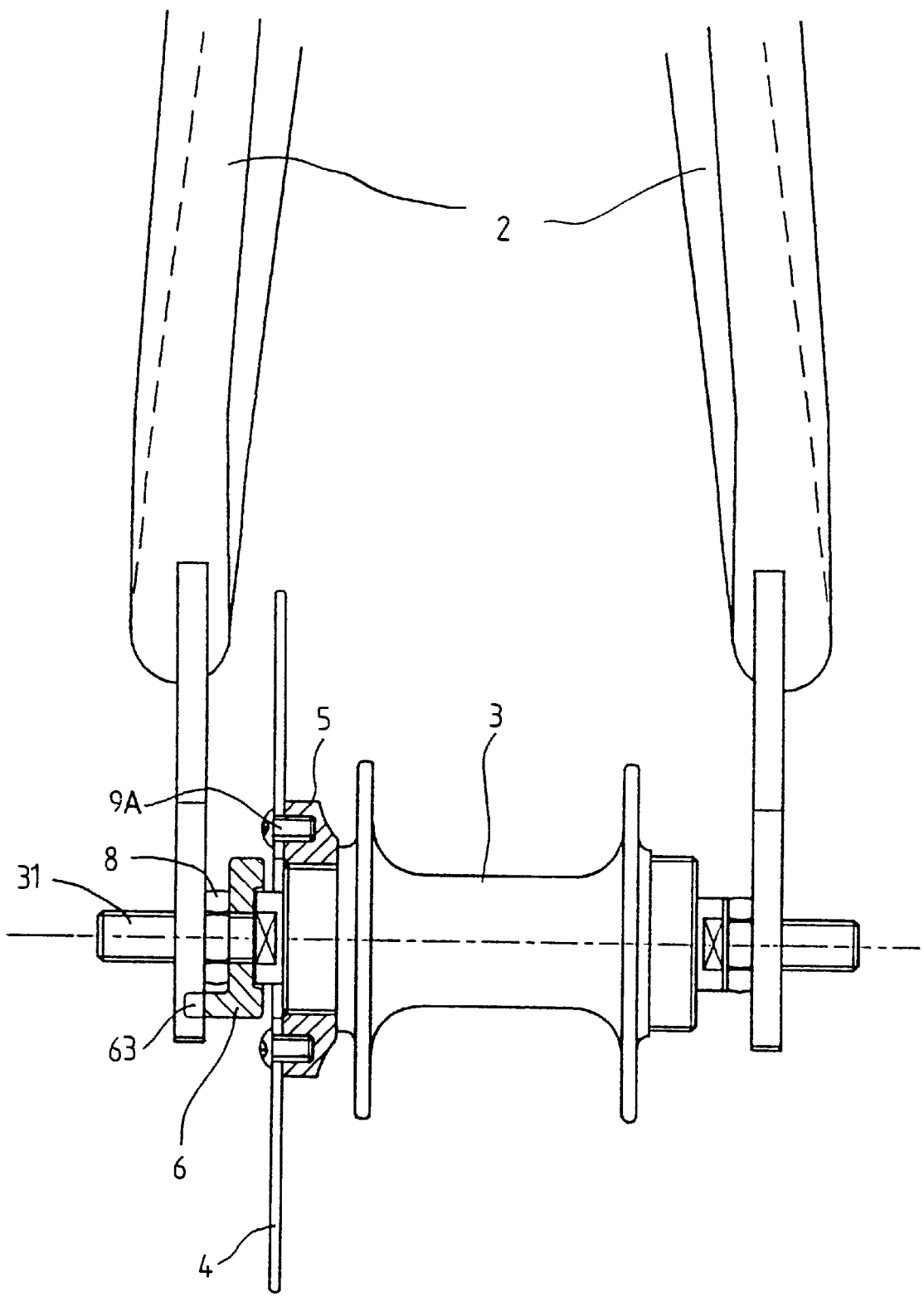
FIG. 5 is an end view to show the disk brake assembly of the present invention connected to the rear wheel, wherein the clamp device is removed for clarity purpose.
Figure 6:
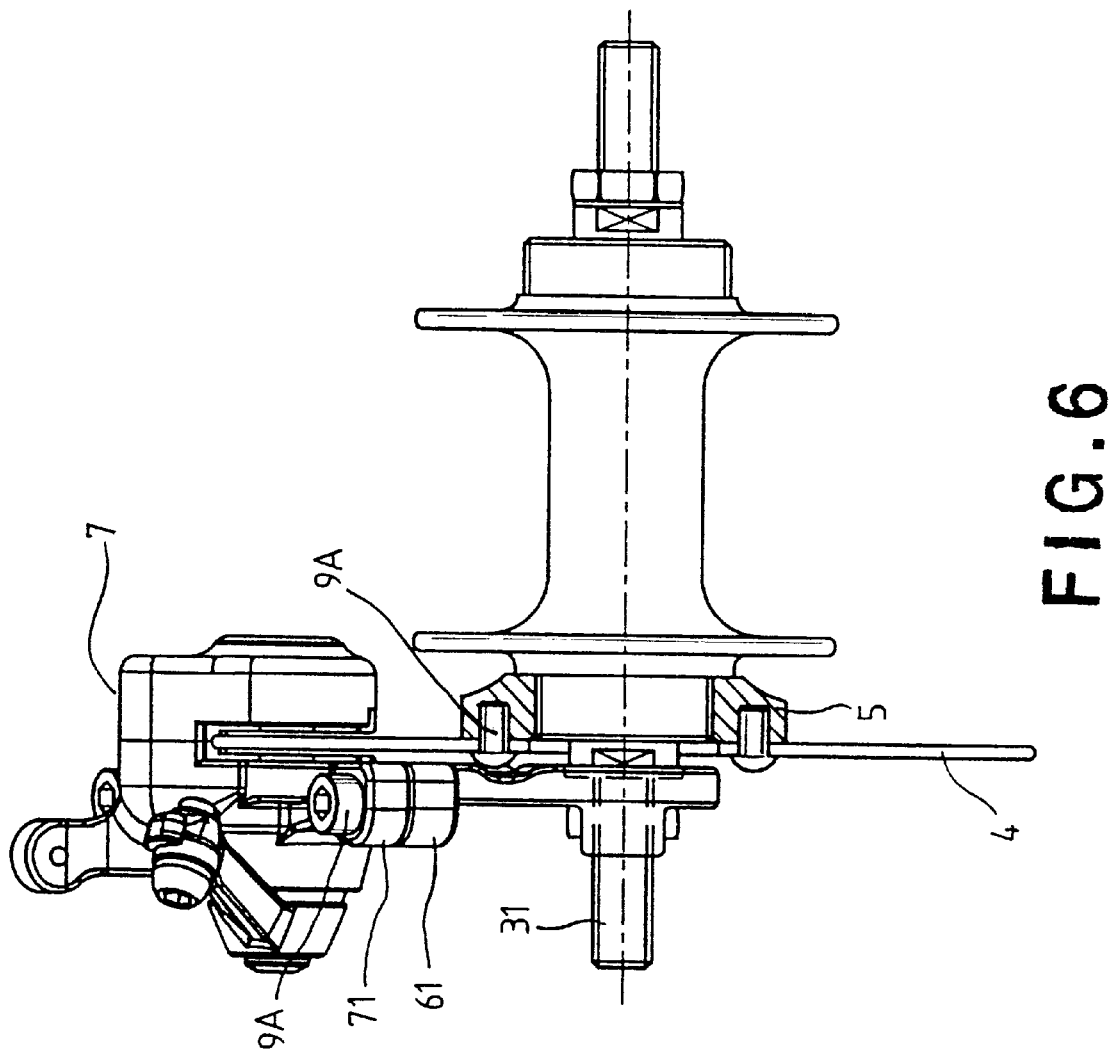
FIG. 6 is an end view to show the disk brake assembly of the present invention connected to the rear wheel, wherein the clamp device is connected to the connection member.

Referring to FIGS. 3 to 6, the disk brake assembly of the present invention comprises a wheel hub 3 with a shaft 31 extending from two ends of the wheel hub 3. A brake disk 4 has a polygonal hole 41 and is connected to the wheel hub 3 by extending the shaft 31 through the polygonal hole 41. A polygonal block 5 extends from the wheel hub 3 so as to be engaged with the polygonal hole 41 in the brake disk 4. The brake disk 4 has a lot of holes for bolts 9A extending therethrough and engaged with threaded holes defined in the polygonal lock 5.

A connection member 6 has a connection hole 62 for the shaft 31 extending therethrough and the brake disk 4 is located between the connection member 6 and the wheel hub 3. The connection member 6 has two connection ports 61 and a clamp device 7 is connected to the two connection ports 61 by bolts 9B extending through holes 71 in the clamp device 7 and engaged with the connection ports 61.

A bicycle frame 2 such as a front fork or a chain stay has a slot 22 defined in an end piece of the bicycle frame 2 and the wheel shaft 31 is engaged with the slot 22. A nut 8 is used to be securely mounted to the shaft 31 and the connection member 6 is securely positioned between the brake disk 4 and the bicycle frame 2. A stop 63 extends from the connection member 6 and is located in the slot 22 of the bicycle frame 2 so as to prevent the connection member 6 from being rotated and disengaged from the slot 22.

It is to be noted that the disk brake assembly of the present invention is connected to the wheel hub 3 and is independent from the bicycle frame 2 so that when adjusting the wheel hub 3 relative to the bicycle frame 2, the disk brake assembly will not be affected. The disk brake assembly can be used on BMX bicycles. The hole 62 in the connection member 6 can be made to open to a side of the connection member 6 so as to easily engage with the shaft 31.

While we have shown and described various embodiments in accordance with the present invention, it should be clear to those skilled in the art that further embodiments may be made without departing from the scope and spirit of the present invention.

What is claimed is:

1. A disk brake assembly comprising:

a wheel hub with a shaft extending from two ends of said wheel hub, a polygonal block extending from said wheel hub;

a brake disk connected to said wheel hub and said shaft extending through a polygonal hole in said brake disk, said polygonal block engaged with said polygonal hole in said brake disk, a connection member having a connection hole for said shaft extending therethrough and said brake disk located between said connection member and said wheel hub, said connection member having two connection ports and a clamp device connected to said two connection ports, and a bicycle frame having a slot in which said wheel shad is engaged, said connection member securely positioned between said brake disk and said bicycle frame.

2. The assembly as claimed in claim 1 wherein said brake disk is fixedly connected to said polygonal block by bolts.

3. The assembly as claimed in claim 1 further comprising a stop extending from said connection member and said stop located in said slot of said bicycle frame.

* * * * *